United States Patent [19]

Ricciardi et al.

[11] Patent Number: 5,702,652

[45] Date of Patent: Dec. 30, 1997

[54] CONTROLLED COOLING OF POROUS MATERIALS

[75] Inventors: Michael A. Ricciardi, Fort Smith, Ark.; Anthony C. M. Griffiths, Cheshire, Great Britain

[73] Assignee: Crain Industries, Inc., St. Louis, Mo.

[21] Appl. No.: 788,627

[22] Filed: Jan. 24, 1997

Related U.S. Application Data

[63] Continuation of Ser. No. 335,522, Nov. 7, 1994, abandoned, which is a continuation of Ser. No. 531,958, May 31, 1990, Pat. No. 5,401,448.

[51] Int. Cl.$^6$ .............................. B29C 71/00; B29C 35/16
[52] U.S. Cl. .............................. 264/37; 264/236; 264/237; 264/344; 264/348
[58] Field of Search .................... 264/37, 40.1, 40.6, 264/40.7, 85, 86, 236, 237, 321, 327, 344, 348; 425/74, 84, 135

[56] References Cited

U.S. PATENT DOCUMENTS

| | | | |
|---|---|---|---|
| Re. 32,032 | 11/1985 | Pettingell | 264/101 |
| 3,061,885 | 11/1962 | Rogers et al. | 18/48 |
| 3,874,830 | 4/1975 | Carter et al. | 425/4 R |
| 3,890,414 | 6/1975 | Ricciardi et al. | 264/45.1 |
| 4,228,076 | 10/1980 | Pettingell | 264/321 |
| 4,344,903 | 8/1982 | Pascouet | 264/55 |
| 4,435,523 | 3/1984 | Ponzieli | 521/51 |
| 4,504,429 | 3/1985 | Griffiths | 264/40.5 |
| 4,537,912 | 8/1985 | Griswold | 521/53 |
| 4,567,008 | 1/1986 | Griffiths | 264/40.5 |
| 4,731,208 | 3/1988 | Nakagawa | 264/37 |
| 5,128,379 | 7/1992 | Stone | 521/50 |

FOREIGN PATENT DOCUMENTS

| | | |
|---|---|---|
| 2904943 | 8/1979 | Germany. |
| 29 45 856 | 5/1981 | Germany. |
| 2014168 | 8/1979 | United Kingdom. |
| 86040017 | 7/1986 | WIPO. |
| 8604017 | 7/1986 | WIPO. |

OTHER PUBLICATIONS

J.H. Webb and A.C.M. Griffiths, Flexible Polyurethane Foam, Slabstock Manufacture Through The Next Decade, 30th Annual Polyurethane Techinal/Marketing Conference (1986), pp. 62–66.

*Primary Examiner*—Angela Y. Ortiz
*Attorney, Agent, or Firm*—Herzog, Crebs & McGhee, LLP

[57] ABSTRACT

Method and apparatus for cooling porous materials whereby first gases are passed through a porous material, such as polyurethane foam, in a first zone at a predetermined flow rate to cool the porous material and to remove volatiles therefrom in a first gas mixture which exits the porous material at a predetermined temperature. The first gas mixture is combined with second gases having a temperature which is lower than that of the first gas mixture to form a second gas mixture having a temperature which is sufficiently low to condense or sublime one or more of the volatiles. Thereafter, the second gas mixture is passed through the porous material to filter the condensed or sublimed volatiles thereon and to further cool the porous material. The flow rate of the heated gases is controlled to provide a controlled uniform cooling of the porous material, and additional filters may be utilized to remove particulate matter from either of the heated gases or the cold gases, or both.

17 Claims, 12 Drawing Sheets

CONTROLLED COOLING OF POROUS MATERIALS

This is a continuation of application Ser. No. 08/335,522, filed Nov. 7, 1994, now abandoned, which is a continuation of application Ser. No. 07/531,958 filed May 31, 1990, now U.S. Pat. No. 5,401,448.

FIELD OF INVENTION

The invention relates to production of porous materials. It is of general application but is described in particular in relation to the production of plastic foams, and especially polyurethane foams.

BACKGROUND ART

Processes for the production of polymeric foams by reactive chemical routes are varied and well known. An example is flexible polyurethane foam which is produced in blocks typically 2 meters×2 meters×1 meter. These large blocks can be produced either continuously on conveyor type machines, or discontinuously in molds.

In the case of flexible polyurethane foam, the reacting mass achieves a high exotherm temperature within a very short time, typically between 5 minutes and 30 minutes. Blocks once made therefore have to be transferred to an intermediate "cure area" where they are carefully stacked with air space around each block until they have cooled. A large area is required for this purpose and the blocks typically need to be stored for a minimum of 10 hours before they can be restacked or loaded for transporting to the customer. This process of intermediate storage, to ensure adequate cooling of the blocks, is inconvenient and costly in space requirements. Further, the intermediate storage area contains a large number of blocks of inflammable foam at high temperature, presenting a potential fire hazard. The building used for this intermediate storage needs to be specially constructed to meet fire regulations.

A further important factor is that certain of the foam forming reactions are reversible at high temperature, typically the allophanate reaction following the initial polyurethane bond formation. The blocks of foam in the intermediate storage area are frequently at an internal temperature exceeding 140° C. for several hours. If the ambient atmosphere in the intermediate area is not controlled, i.e. is of variable humidity, there is a potential for ingress of moisture into the block which will react with free isocyanate end groups and terminate them:

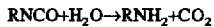

$RNCO+H_2O \rightarrow RNH_2+CO_2$

This reaction, removing the isocyanate required for the allophanate reaction, results in a reduced, uncontrolled level of cross linking in the foam and therefore a variable, reduced, stiffness or compression hardness. In geographical locations where a high ambient humidity is common, it is known for foamers to increase the quantity of isocyanate in a given foam recipe deliberately, in spite of the cost penalty in doing so, so as to allow for the hardness loss that would otherwise be experienced.

It has been proposed in PCT/GB85/00605 (published No. WO 86/04017) to use a new approach of early cooling, and specifically a method of making blocks of polyurethane or other foam arising from exothermic reaction of foam-forming materials, wherein once the reaction has reached a desired stage of completion a gas of suitable composition and temperature is passed through the body of the block to carry away the heat of reaction. Other earlier proposals are those of Riccardi et al U.S. Pat. No. 3,890,414 (published 1975) and Continental Gummi Werke German OLS 2,456,421 (published 1976). The cooling gas as proposed will normally be air, and the approach is the reverse of the conventional approach of slow cooling and minimum exposure to air while cooling takes place.

The conventional approach has to be seen in the light of a long standing problem in the polyurethane foam industry, namely autoignition of foam blocks due to excessive chemical exotherm. The problem occurs particularly with certain low density and high exotherm grades of foam, or foams containing additives which are included to render the foam resistant to small sources of ignition. Such foams can, after a period of two to three hours, and after they have started to cool, begin to increase in temperature again. This second exotherm is normally a self progressive type, eventually resulting in autoignition. Several factories have been burned down because of this phenomenon. One mechanism is thought to be the drawing in of air from the atmosphere as the block cools. The oxygen enriched atmosphere within the block then causes exothermic oxidation of the polyurethane polymer with a resulting temperature rise. The presence of air drafts around the blocks has been shown to exacerbate the problem.

The new approach in contrast deliberately supplies air, usually controlling its composition at least as to moisture content, but on its own has been found insufficient.

In particular, polyurethane foam commonly contains butylated hydroxy-toluene ("BHT" full, name 2,6-ditertiarybutyl-4-methyl phenol), which is used as an antioxidant in the polyols that are reacted with isocyanates such as toluene diisocyanate ("TDI") to form the foam. This is a solid subliming at 70° C. and therefore taken up in cooling air passed through blocks at initial temperatures of 140° C. or higher. For heat recovery and control of moisture content, and also to prevent uncontrolled levels of residual isocyanate or auxiliary blowing agents such as chlorofluorocarbons ("CFCs") reaching the atmosphere, the cooling air is desirably recycled. This is done via a heat exchanger, and that then rapidly blocks up with a solid deposit of BHT together with some polyurea formed from residual TDI and moisture. Other antioxidants and additives cause similar problems.

SUMMARY OF THE INVENTION

The invention was made in the context described above, wherein it has been found that, generally, problems with volatiles, particularly subliming volatiles, taken up from a porous material by cooling gases and later separating out, can be solved by using separate cooling gas streams, as set forth herein.

Briefly, the invention may be summarized as the cooling of porous material, where trouble with volatiles taken up from the hot material and later separating out and blocking heat exchangers is prevented by mixing heated gases, coming from a first part of a cooling zone and carrying the volatiles, with cold gases, extraneous or coming via a heat exchanger from a second or subsequent part of the cooling zone, so that the volatiles separate out and, the mixed gases which are passed through the porous material in the second or subsequent part of the cooling zone are filtered out there.

More specifically the invention provides a process and plant for cooling of porous materials particularly blocks of polyurethane or other open cell foamed plastics prepared from an exothermic reaction of foam forming materials, the porous materials containing volatiles taken up by cooling gases and separating out therein on cooling of the gases below a separation (i.e. sublimination or condensation) temperature, characterized by:

i) effecting the cooling of the porous materials in two or more successive zones, ii) mixing gases emerging from the first zone, carrying the volatiles, with gases at a lower temperature, particularly gases emerging from the second or subsequent zones and thereafter cooled by heat exchange, whereby the temperature of the mixed gases is brought below the separation temperature, and iii) passing the mixed gases through the porous material to filter out the separated volatiles.

Thus, first gases are passed through the porous material in a first zone to cool the porous material and to remove volatiles therefrom in a first gas mixture which exits the porous material. The flow rate of the first gases through the porous material is controlled to provide a controlled, uniform cooling rate thereof. This first gas mixture is combined with second gases having a lower temperature to form a second gas mixture having a temperature which is sufficiently low to condense one or more of the volatiles. Finally, the second gas mixture is passed through the porous material in a second zone to filter condensed or sublimed volatiles thereon and to further cool the porous material.

It is also desirable to remove particulate matter from the first gas mixture prior to mixing with the second gases. Also, particulate matter may optionally be removed from the second gases prior to mixing with the first gases. This removes certain materials from the gas streams and prevents later buildup on the heat exchangers which are utilized to cool the gas.

The flow rate of the first gases through the porous material is controlled by directing the first gas mixture exiting the porous material through a conduit and reducing the cross-sectional area of the conduit. Alternatively, the flow rate may be controlled by varying the speed of a fan member positioned in the conduit. Also, cooling of the porous material can be controlled by selection of the temperature of the cooling gas.

A third gas mixture exiting the second zone of the porous material at one or more locations is recirculated for combination with the first gas mixture. Preferably, the third gas mixture may be cooled prior to mixing with the first gas mixture. The temperature of the thus formed second gas mixture may be reduced sufficiently to condense or sublime further volatiles as well as to remove condensed moisture.

The use of the porous material as its own filter in this way gives a neat and satisfying solution to the problem and moreover is compatible with withdrawing part of the cooling gases coming from the second or subsequent zones for recovery of volatiles not separating out at the temperature of the mixed gases. For example, for recovery of solvents or CFCs or other auxiliary blowing agents in polyurethane foam production, part of the gases from the second zone, with or without heat exchange, can go to a carbon bed or other absorption recovery plant without problems of blockage of the absorption medium with separated volatiles.

In application to polyurethane foam production with BHT as the troublesome volatile, the process may specifically be such that the gases emerging from the foam block in the first zone are above 70° C. and the temperature of the mixed gases which effect further cooling in the second subsequent zones is below 70° C. whereby BHT and other volatiles in the foam are volatilised in the first cooling zone, and BHT is condensed out in the mixed gases, and filtered out in the second or subsequent cooling zones. Other volatilising antioxidants are likewise separated, at appropriate temperatures.

Blocks can for example be partially cooled in the first zone, the cooling gas from that zone (normally air) then being mixed with gas from the second zone cooled to a suitable temperature by heat exchange to give a mixture temperature of for example 30°–40° C. The BHT precipitates out in the 30°–40° C. air stream and is filtered out on the block surface. As a normal constituent of the foam it is unobjectionable there, and is in any case removed by later trimming during conversion to the final foam products.

The process further has the inherent advantage of reducing TDI emissions in polyurethane foam production. Free TDI in the gas from the first zone largely reacts in the cool areas of the block in the second zone, so that even when part of the gas from the second zone is being withdrawn for auxiliary blowing agent recovery there is little TDI in it. The whole process in any event greatly reduces TDI emissions because large areas of foam surface are no longer exposed during slow natural cooling of stored blocks from high temperatures.

DETAILED DESCRIPTION OF THE INVENTION

The degree of control of the cooling gas passed varies according to circumstances and the class of material being produced. It may be no more than to ensure that the ambient air is of satisfactory temperature and humidity and is free of dirt or other pollutants harmful to the foam. For certain applications, however, the moisture content of ambient air may be reduced and its cooling power raised by cooling the air and removing condensed moisture. For special purposes, liquefied gases may be used for intense cooling, and/or inert gases such as nitrogen.

In plastic foam production, the stage at which cooling is done is important. For reduction of block holding times and thus space requirements and other disadvantages or risks such as autoignition it is desirably as early as possible. It must not however be so early that the reaction forming the polymer of the block is not sufficiently completed. Normally the time/temperature curve of the block should have peaked, indicating substantially full reaction, but in some circumstances a somewhat earlier commencement of cooling (with polyurethane foam at least) will reduce the initial but not the in-service hardness of the foam. Polyurethane foam can feel undesirably stiff when new, for example in seat cushions, reaching after a period of service a hardness that it substantially retains thereafter. This "false hardness" can be reduced or eliminated by early cooling, before the peak block temperature or reaction exotherm has been reached.

In polyurethane foam production, the gas may be drawn most readily through the cut faces of blocks made on continuous machines but it has surprisingly been found that at least on lightly skinned blocks such for example as those produced by the VERTIFOAM (Trademark) process of U.S. Pat. No. 4,504,429, air or other gas can be drawn through the skinned faces. Such a process is convenient in that the cut length of blocks is more likely to be varied in a production run than their other dimensions, and the cooling equipment can conveniently therefore be set up for passing the gas through a constant foam thickness. Indeed the blocks could be separated from each other after the cooling method is completed.

RELATION OF TEMPERATURE/TIME IN BLOCK

In the case of flexible polyurethane foam cooled in a conventional manner, temperature the typically rises very quickly in the first ten to thirty minutes to 150°–170° C. and then levels out. After a time of one to three hours, depending on the density of the foam, the temperature starts to fall. Typically a time of at least ten hours must be allowed before the blocks may be safely stacked or loaded onto transport vehicles.

The exact point at which cooling as described herein begins depends on the effect required. It has been found that, in order to achieve a final foam hardness equivalent to that of a conventionally cooled block it is generally necessary to delay the application of rapid cooling until the peak exotherm temperature has been reached, i.e., until after about 30 minutes. Alternatively, if it is required to achieve a foam block with reduced hardness, the rapid cooling process may be applied earlier. For the embodiments where the cooling rate of the foam is controlled (i.e., to slow cooling rates), it is possible to utilize this cooling process within about 20 minutes after formation without deleteriously affecting physical properties.

MODIFICATION OF COOLING GAS

A further advantage is that, by modifying the composition of the cooling gas, for example in plastic foam block production, so as to include material which will modify the foam by reacting with the basic foam constituents, the final properties can be influenced. For example, in polyurethane foam production, a monofunctional hydroxy compound such as methanol may be introduced with the gas mixture while the internal block temperature is elevated, controlled termination of isocyanate groups can be achieved, resulting in a block of foam having controllably reduced compression hardness or stiffness because of the reduced level of chemical cross linking. For certain applications, moisture or high humidity air may be utilized to accelerate curing of the foam. One skilled in the art having this disclosure before him can select the optimum cooling gas composition to achieve the desired results.

SCORCH CONTROL

A common problem and potential hazard in foam block manufacture is "scorch". This is manifested by a yellow or brown discoloration in the center of the block which is undesirable in itself and in severe cases can develop into a thermal runaway leading to a fire.

One cause of scorch is thought to be oxidation of the hot foam and it is known that ingress of oxygen from the atmosphere, while the foam is at an elevated temperature, is a significant factor. Rapid cooling of the block to a safe intermediate temperature or even to ambient temperature minimizes scorch and if done by introduction of a cool inert gas such as nitrogen, which is incapable of supporting oxidation of the foam, eliminates at the source any risk of such oxidative heating.

OTHER TYPES OF FOAM

The discussion is largely based on flexible polyurethane foam blocks as an example of the porous materials to which it generally applies, but it will be clear that the rapid cooling process is applicable to other open celled foams produced by exothermic reaction. Examples of such foams are, high resilience flexible polyurethane foam, phenol formaldehyde foams, silicone foams, polyimide foams, polyimidazole foams, epoxy foams, polyester urethane foams and chemical combinations of these types. In some cases, an example being high resilience flexible polyurethane foam, the foam block may need to undergo an additional process to make it fully open-celled. In the case of the aforementioned high resilience foam, the block may be mechanically crushed in order to produce fully interconnecting open cells. Clearly in such a case the cell opening process needs to be carried out prior to commencement of the rapid cooling process. The point particularly arises with combustion modified high resilience ("CMHR") polyurethane foams, containing for example melamine powder as the combustion modifier. With such foams a longer holding time is necessary before cooling than with fully open cell foams, for example one hour, to allow the crushing without damage to the foam.

MACHINES

While the invention lies primarily in the process, it extends also in the case where plastics foams are being made to foam producing plant in which a foaming machine for production of blocks of open-cell foam by exothermic reaction of foam forming materials is associated with means for holding the blocks produced until the reaction has reached the desired stage and with means for subsequently passing the cooling gas as set out earlier, until a stable temperature is reached. Other machine features of significance are further set out in the claims and described below.

Conveniently in particular a vertical foaming machine of the type described in U.S. Pat. No. 4,504,429 is associated with a conveyor which constitutes the holding means and which passes the blocks to a cooling chamber wherein the cooling gas is passed.

The concept of rapid cooling of a block in minutes rather than hours is particularly attractive when considered, as above, in conjunction with a process which is producing blocks of foam at a modest rate. An example of such a process is the vertical foam process as described in U.S. Pat. No. 4,504,429, where typically blocks are cut off at a rate of, for example, one every 2 minutes. An economically very attractive arrangement is to site a rapid cooling unit adjacent to the vertical foam machine. Subject to a minimum holding time where necessary for sufficient reaction, blocks can be individually cooled as they are produced, whereupon they can be immediately stacked in an efficient manner or even loaded directly onto transport. Blocks can even be cooled as a continuous body, individual blocks being cut after cooling. By this means the block inventory is kept to an absolute minimum and the need for the customary large and costly intermediate storage area, with its inherent problems, is eliminated.

It will be appreciated that for a continuous foam production process it is convenient to cool blocks on a continuous cooling unit rather than one by one, with the potential of cutting off after cooling if required. The blocks are conveyed e.g. by open mesh conveyor which passes through a pressure/suction zone where the pressure difference across the block causes a flow of air through the foam. The speed of a conveyor is adjusted so that the blocks have cooled sufficiently by the time they emerge from the other end, The process can be conveniently monitored by means of a temperature probe at the far end of the low pressure zone.

The blocks are normally rectangular but if a round block for peeling is required it can longitudinally rest on a correspondingly shaped conveyor, conveniently with flexible side seals as discussed below for rectangular blocks. Furthermore, if the round block is cut into discrete lengths, it is also possible to place the cut circular face of each block onto a flat conveyor, thus eliminating the need for a conveyor which has a shape that corresponds to the cylindrical surface of the round block.

BRIEF DESCRIPTION OF THE DRAWINGS

The invention is illustrated by detailed examples below and by discussion of the drawings which are.

DESCRIPTION OF DEVICE USED IN EXAMPLES 1-9

Figure 2:
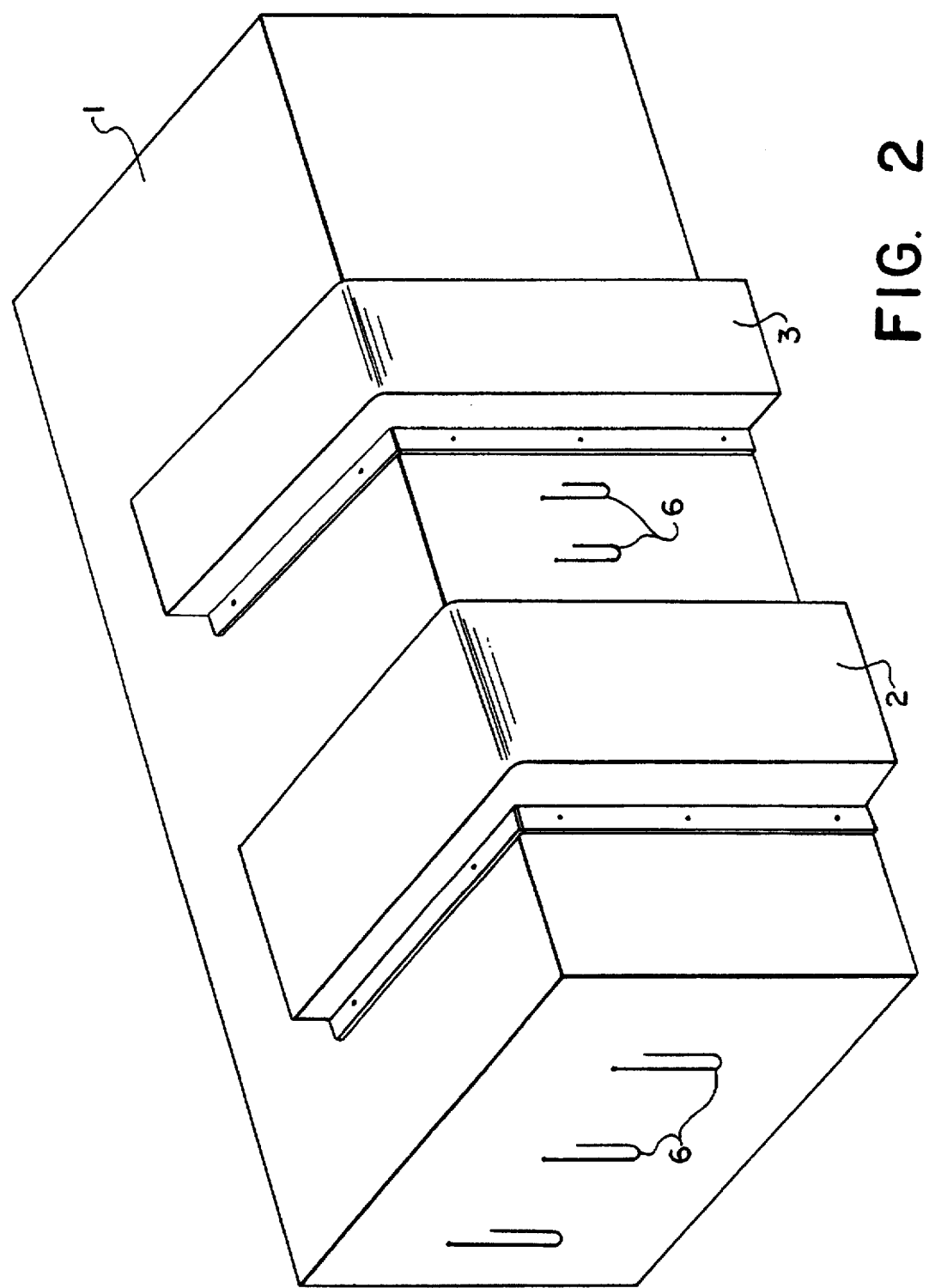
FIG. 2 is a perspective view of single-block cooling device used as referred to in Examples 1 to 6.
Figure 3:
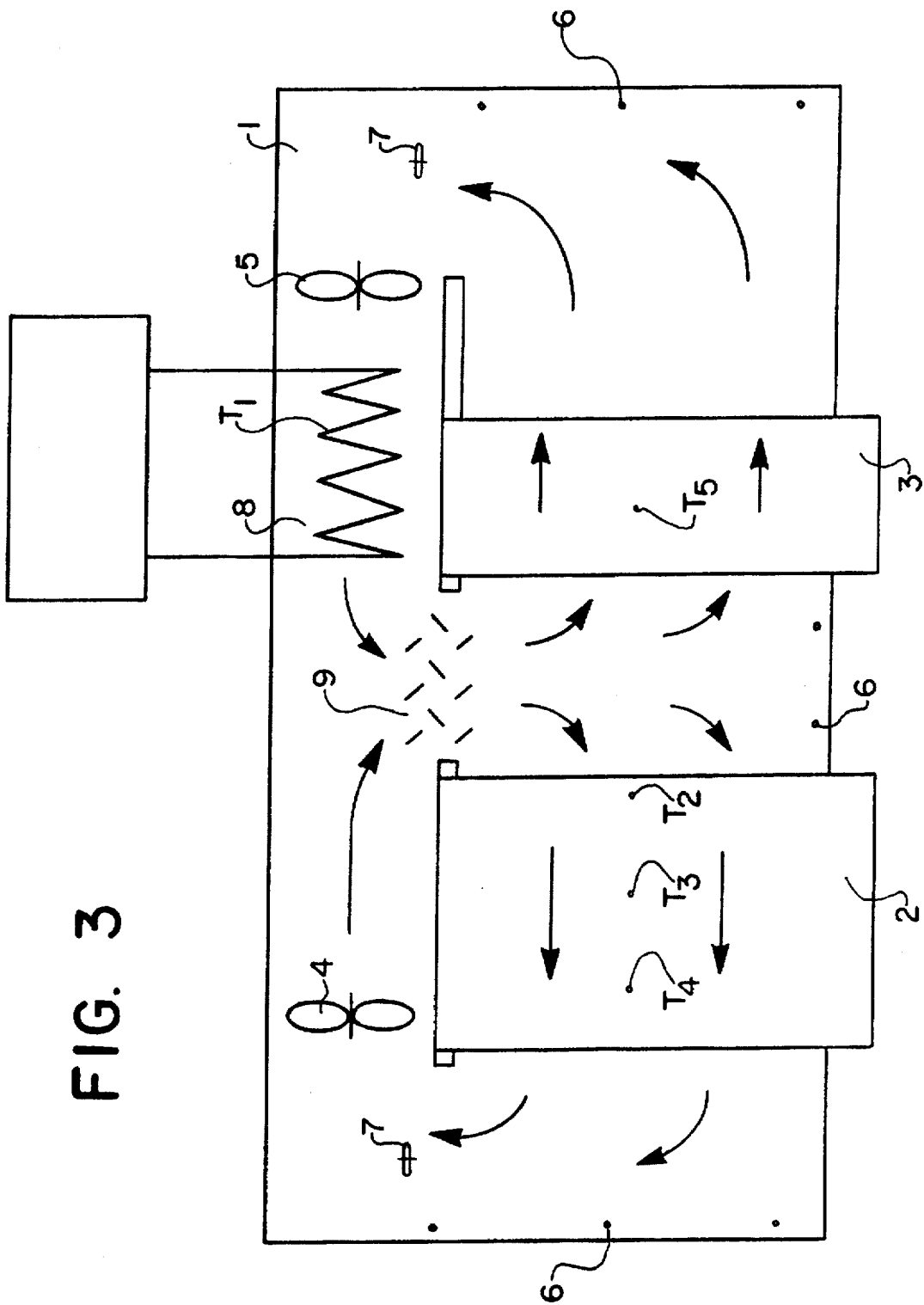
FIG. 3 is a schematic plan view of the device of FIG. 2.
Figure 4:
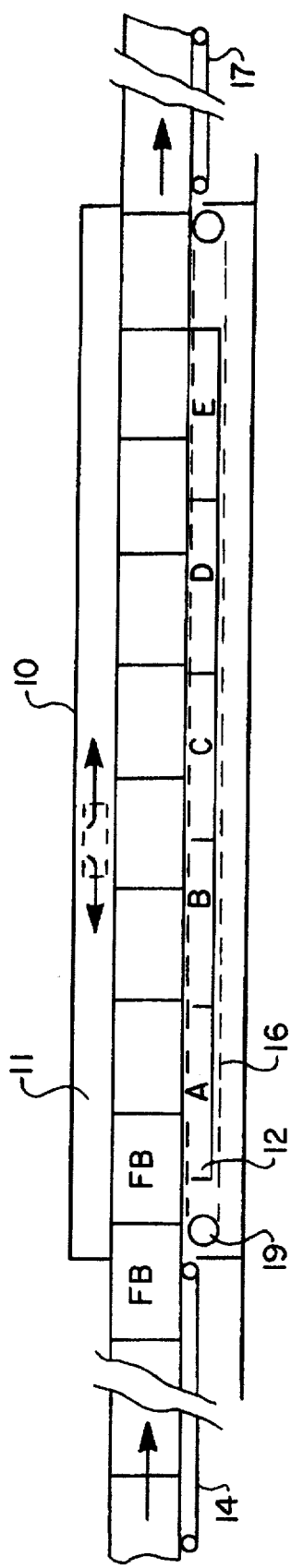
FIG. 4 is a sectional longitudinal elevation of a continuous cooling apparatus in accordance with the invention.

The cooling equipment of FIGS. 2 and 3 includes an enclosure 1 into which can be inserted two foam blocks A and B each having dimensions approximately 1.7 meters wide×1.1 meters high. The length of the blocks is proportioned to give appropriate air flow through each. The blocks of foam may be produced on any conventional continuous foam process or for example by the VERTIFOAM process described in U.S. Pat. No. 4,504,429. The blocks are positioned in such a manner that the circulated air flows in through one and out through the other of the faces of the blocks. Leakage of the circulated air is minimized by an adjustable seal which may be fitted tightly against the foam surface.

Further sealing of the blocks of foam into the enclosure is effected by a cover (not shown) placed over the enclosure and sealed against it.

Air or any other chosen cooling gas is circulated through each of the foam blocks, by the centrifugal fans 4 and 5. The pressure of the air entering the blocks and leaving the blocks is measured by means of water filled "U" tubes 6 at each side of the enclosure. The volume of air flow is calculated from air velocity measurements made by means of flow meters 7 placed in the air stream.

The air emerging from foam block A at position 2 is mixed with the air which has emerged from block B at position 3. The air from block B is however first passed through a refrigerator cooled radiator 8 before mixing the air stream by means of the baffles 9.

The incoming air is not necessarily required to be cooled below ambient, but an advantage of cooling to lower than ambient temperature is that, when desired, the water vapor content may be reduced to a low level.

Temperature of the air from block B is monitored by a thermocouple (T1). Temperatures of the foam blocks are monitored by means of thin wire thermocouples (T2)-(T5) inserted in various positions within the foam blocks.

This apparatus was used in the following Examples.

EXAMPLE 1

A block of flexible polyurethane foam was produced by the VERTIFOAM continuous foam process described in U.S. Pat. No. 4,504,429. The chemical formulation was as follows:

TABLE 1

|  | Parts by Weight |
|---|---|
| Polyether polyol (3500 molecular weight weight 48 hydroxyl no.) | 100 |
| Water | 4.5 |
| Silicone surfactant | 0.9 |
| Amine catalyst 'Dabco' (Trade Mark) 33LV | 0.2 |
| Stannous octoate catalyst | 0.2 |
| Trichlorofluoromethane 'Arcton' (Trade Mark) II | 1.5 |
| Toluene diisocyanate (80:20 TDI) | 55.6 |

Approximate time from the chemicals being mixed in the mixing head, to the block being cut off was eight minutes. The time of cut off was noted. Dimensions of the block were 1.7 meters wide×1.1 meters high×1 meter long (cut face to cut face).

The foam block A was positioned in position 2 in the cooling enclosure so that the air flow direction through the block was from one cut face to the other.

In position 3 in the cooling enclosure was placed a similar block of foam, B, but which had completed its cure by conventional means. The cut-face to cut-face dimension was approximately half that of the hot block(s).

At thirty minutes after cut off time (just past the exotherm peak) the refrigerator was switched on. When the radiator temperature reached −10° C. (after about 1 minute) the circulating fans were switched on. Pressure measurements were (in mm water):

TABLE 2

|  | Inlet Face | Outlet Face |
|---|---|---|
| Block A | +15 | −40 |
| Block B | +15 | −35 |

Air flow volume rate for block A was calculated at 25.2 cubic meters/minute. The corresponding air flow for block B was calculated at 49.8 cubic meters/minute.

Temperatures were monitored by thermocouples placed as follows:

TABLE 3

| Reference | Position - Block A |
|---|---|
| C1 | In the airflow at the cooled radiator |
| T2 | Inserted to a depth of 10 mm into the center of the inlet face of the block |
| T3 | Threaded by means of a long 'needle' into the center of the block |
| T4 | Inserted to a depth of 10 mm into the center of the outer face of the block Position - Block (3) |
| T5 | Threaded by means of long 'needle' into the center of Block 3 |

About one minute after the fan had been switched on it was noticed that a small quantity of fume was escaping from leaks around the enclosure seals around the inlet faces of blocks A and B at positions 2 and 3. After the cooling had been completed, it was noticed on close examination that the inlet faces of the foam blocks had a very fine coating of small colorless crystals on their surfaces (in a continuous process only the equivalent of block B would have crystals, block A being represented by incoming, fresh foam). There was no evidence of a deposit on the cooling surfaces of the radiator 8. Eleven and a half minutes after switching on the circulating fan, when the temperature indicated by the thermocouple number 4 dropped to +40° C., the circulating fans were switched off and the foam block removed. Temperature at the center of the block at this time was 40° C. This temperature was monitored for a further four hours to check for any temperature rise due to chemical exotherm but no significant change was noted, the temperature slowly dropping to ambient temperature which was 18° C.

Figure 1:
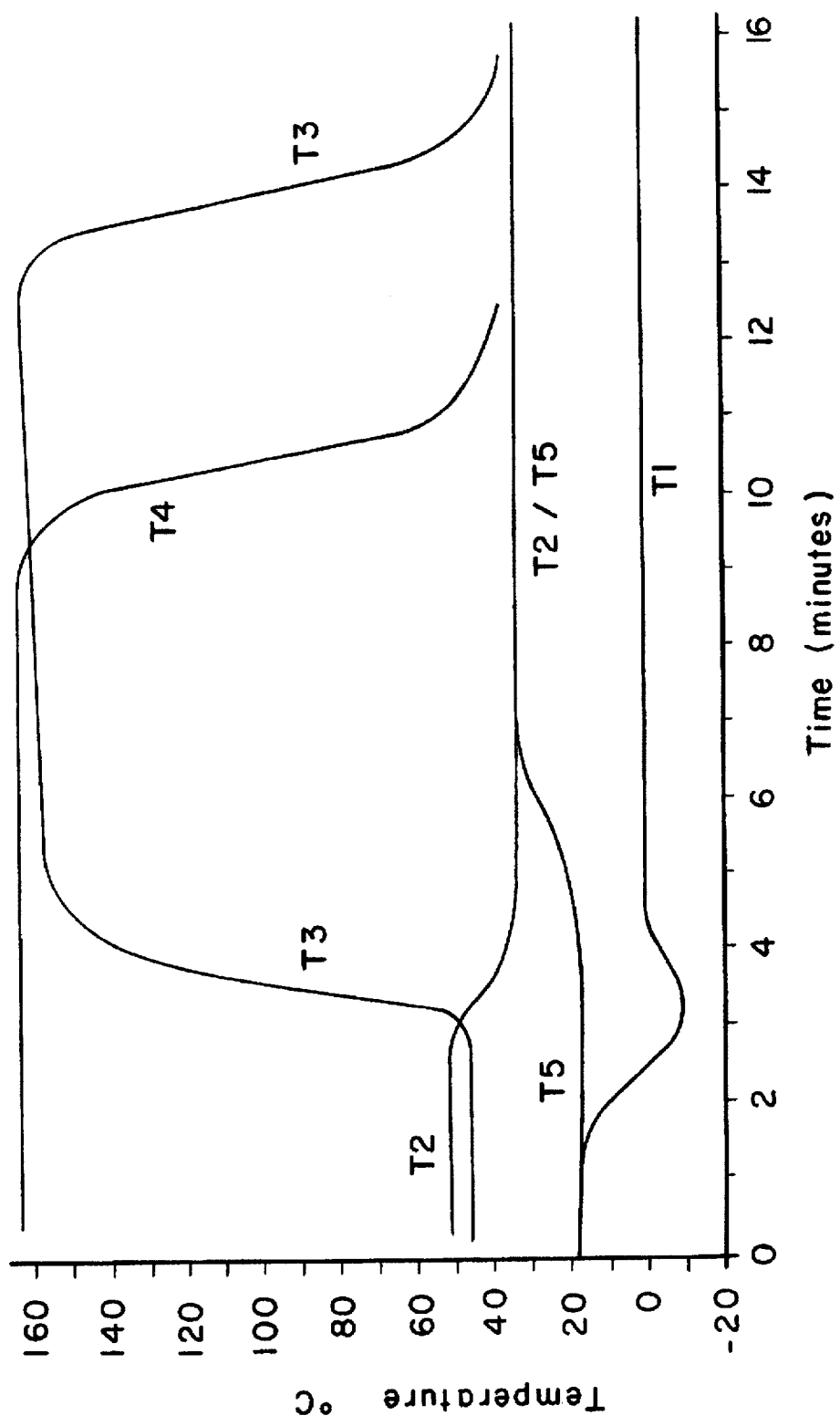
FIG. 1 includes temperature/time curves for the thermocouples referred to in Example 1.

The five thermocouple monitored temperatures were plotted against time and are shown in FIG. 1. It was noted that the temperature at the center of the block was 164° C. before the rapid cooling commenced.

Figure 7:
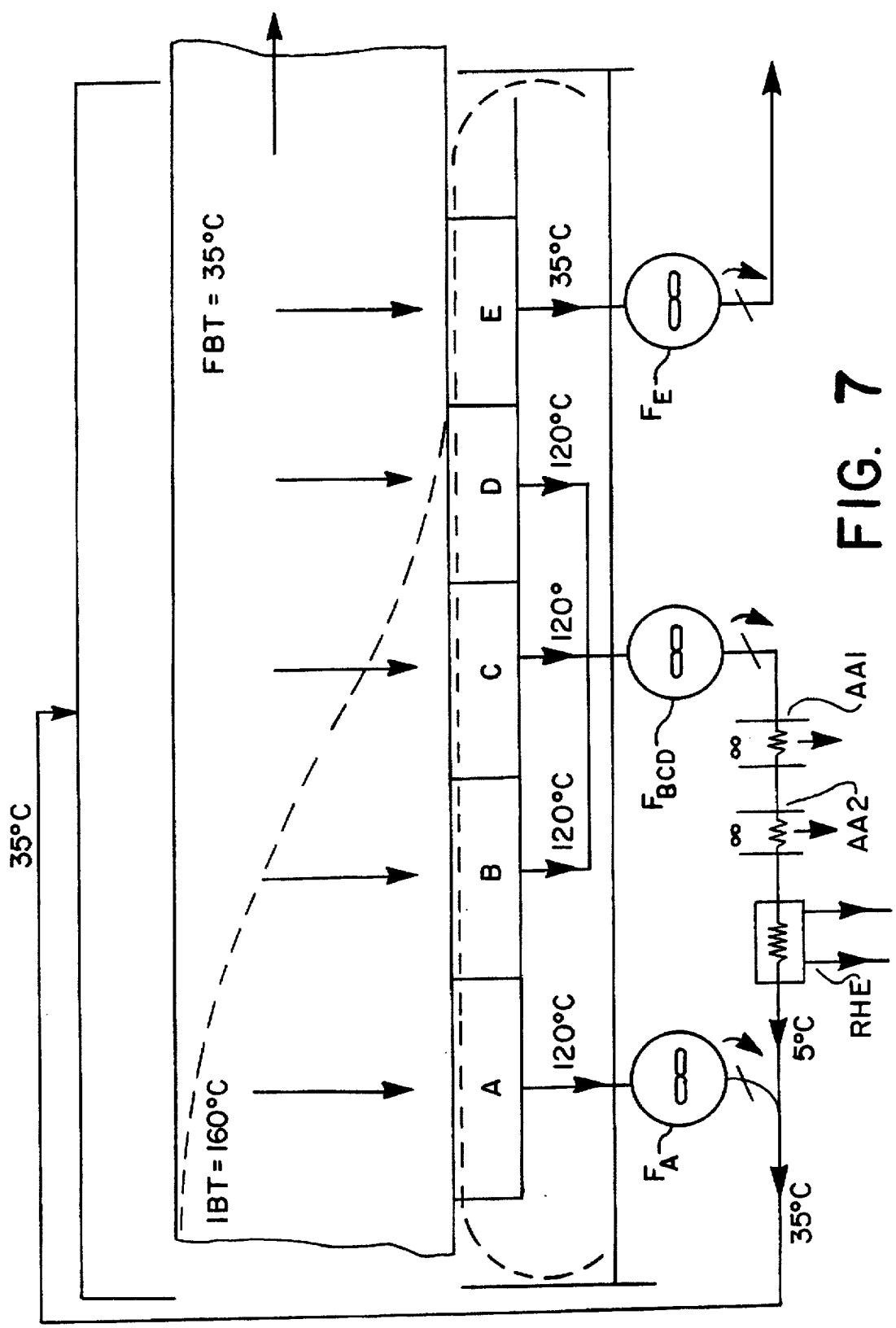
FIG. 7 is a schematic sectional elevation of the apparatus of FIG. 4.

Monitoring of the thermocouples T3 and T4 showed that the block did not cool evenly throughout the mass. Instead, because of the efficient heat exchange between foam and gas, the effect was of a "cold front" moving through the foam block. FIG. 7 shows the equivalent cooling front profile in a continuous process, by a dotted line; IBT=initial block temperature, FBT=final block temperature. The steepness of the profile of course depends on the volume and temperature of the cooling gases passed through a given volume of foam.

The following day the physical properties of the foam were evaluated by testing to BS 3379:1975 "Flexible Urethane Foam For Load Bearing Applications", and compared with similar tests carried out on a conventionally cooled block of foam from the same production run. Results are tabled below.

TABLE 4

Physical Test Results - Example 1

|  | Block A Normal Cooling procedure | Block B Rapid Cooling Procedure |
| --- | --- | --- |
| Piece density, Kg/m3 | 20.8 | 20.8 |
| Sample density, Kg/m3 |  |  |
| Top of block | 20.8 | 21.1 |
| Middle of block | 20.2 | 20.1 |
| Bottom of block | 20.9 | 20.5 |
| Sample of hardness, Newtons |  |  |
| Top of block | 120 | 120 |
| Middle of block | 140 | 135 |
| Bottom of block | 130 | 130 |
| Tensile strength, Kpa | 107 | 100 |
| Elongation at break, % | 250 | 200 |
| Fatigue test (Constant Load pounding test) |  |  |
| Hardness, % | 35.7 | 34.1 |
| Height loss, % | 5 | 5 |

EXAMPLE 2

A block of the same formulation and process as Example 1 was taken and was subjected to the same procedure as Example 1 except that the rapid cooling was commenced at only ten minutes after the cut off time. It was noted that the temperature in the center of the block, in this case was only 150° C. when the circulation fan was started.

Physical tests of the foam were again measured after twenty four hours and it was found that the hardness was lower than that of a conventionally cooled block from the same production run.

EXAMPLE 3

A block of foam of the same formulation and process as Examples 1 and 2 was subjected to the same procedure as Example 1, except that 400 ml of water was spread over the inlet of the block of foam prior to inserting it into the enclosure. Time interval between block cut off and rapid cooling was thirty minutes as for Example 1.

Foam density and hardness were measured the following day, comparing them with conventionally cooled foam from the same production run. Samples were also subjected to the constant load pounding fatigue test, BS 3127 which gives an assessment of service performance. Lower hardness loss indicates superior performance. The results are shown in below in Table 5.

TABLE 5

|  | Conventional Cooled Block | Rapid Cooled Block |
| --- | --- | --- |
| Density | 20.9 | 20.0 |
| Hardness, Newtons | 126 | 110 |
| Hardness after fatique test |  |  |
| Newtons | 87 | 85 |
| % loss | 31 | 23 |

It was noted that the foam samples that had been rapid cooled had a better fatigue performance as measured by the constant load pounding test.

EXAMPLES 4 AND 5

Two foam blocks of the same formulation and process as Examples 1-3 were subjected to the same procedure as Example 3 except that for Example 4 industrial methylated spirit was substituted for the water. In Example 5, 0.880 ammonia solution was substituted for the water used in Example 3.

In both cases the foam was of a lower hardness than the foam blocks from the same run that had been cooled in the conventional manner.

EXAMPLE 6

A flexible polyether urethane foam block was produced by a continuous foam machine of the well known MAXFOAM (Trademark) "trough and fall plate" type. This block was of similar dimensions to the foam blocks used in the previous Examples 1-5. The block was subjected to the same rapid cooling procedure as in Example 1. Physical test results were as follows:

| Density, Kg/m3 | 16.5 |
| --- | --- |
| Hardness, Newtons | 60 |

The foam was within specification for this grade.

EXAMPLE 7

The rapid cooling enclosure, as earlier described and as used for Examples 1-6, was modified so as to enlarge the inlet and outlet orifices to an area of 2.1 meters×1.6 meters. A foam block weighing 58 Kgs and of dimensions 2.2 meters long×1.7 meters wide×1.1 meters high, produced by the VERTIFOAM process (U.S. Pat. No. 4,504,429) was, after a time of thirty minutes following cut off, inserted in the enclosure in such a manner that the air flow direction was through the skinned surfaces of the 2.2×1.7 meter dimensions. The volume air flow rate measured during rapid cooling was 28 cubic meters per minute. The time taken to cool the block to ambient temperature was six minutes.

EXAMPLE 8

A flexible polyurethane foam block of 22 Kg per cubic meter density was produced on the MAXFOAM process using a formulation containing fire retardant additives. This grade of foam normally produces internal discoloration during the conventional cooling process due to the well known phenomenon of "scorch". The foam block, after a delay of fifteen minutes following cut off, was rapid cooled in twelve minutes. The following day the block was cut in half. No scorch was discernible. A block of foam from the same production run which was not subjected to the cooling process of the invention was similarly cut open and exhibited typical "scorch" discoloration.

EXAMPLE 9

A CMHR foam was made according to the following formulation:

|  | Parts by Weight |
| --- | --- |
| Polyol U-1408 (BP Chemicals) | 100 |
| Melamine powder | 20 |
| Water | 2.4 |
| Diethanolamine | 1.2 |
| Proprietary blend of catalyst/silicone surfactant (BP) | 1.3 |
| Thermolin 101 (Olin Chemicals) | 5 |
| CFC-11 | 5 |
| TDI 80:20 (Index 106) | 32.8 |

Blocks were produced by the VERTIFOAM process having a density approximately 35 Kg/m$^3$. One hour after cut-off, the blocks were mechanically crushed so as to open the foam cells and produce a porous foam block before cooling as described herein.

PRODUCTION MACHINE

Figure 5:
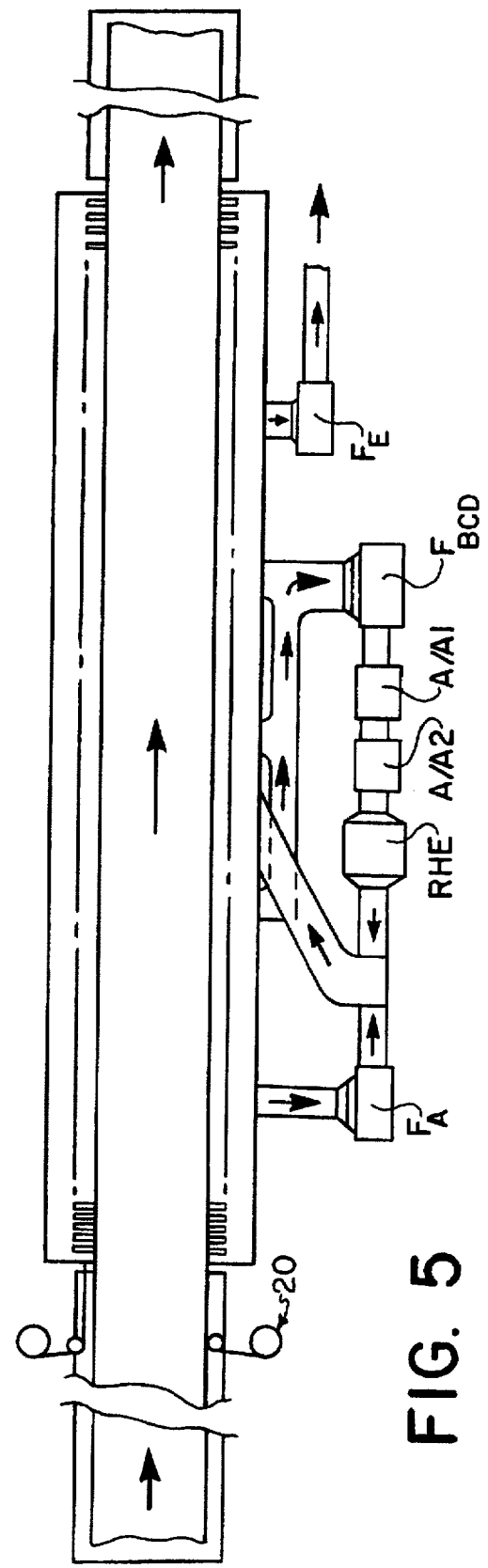
FIG. 5 is a plan view of the apparatus of FIG. 4.
Figure 6:
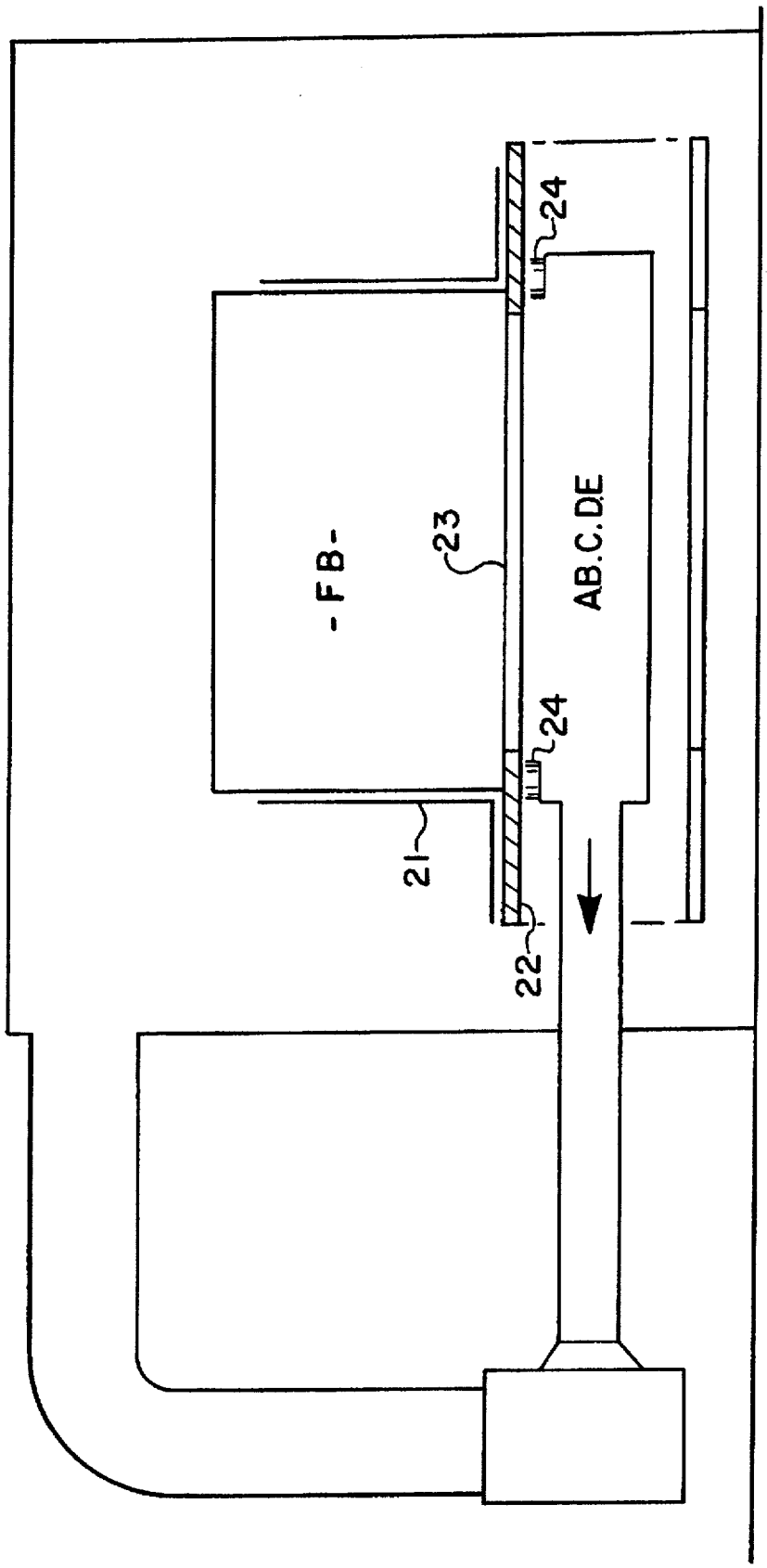
FIG. 6 is an end view of the apparatus of FIG. 4.

A continuous production machine is shown in FIGS. 4 to 7. An enclosure 10 defines an undivided inlet zone 11 and an exit zone 12 divided into suction boxes (A, B etc) from which gases are drawn by corresponding centrifugal fans (FA, FBCD, FE). The fan at A for example has a capacity of about 1800 cu ft/per min. at 2 inch water gauge suction (i.e., 3000 m$^3$ per hr. at 50 mm water gauge). The suction boxes lie below a slat conveyor 16 sealed by brush seals 24 (FIG. 6) and strips of closed cell foam rubber 22 between the ends of the slats 23, leaving a suction slot width of for example 1.5 m according to block width. The cooling gases are drawn through the skinned top and bottom faces of the foam blocks (FB). The sides of the blocks are sealed by applying polyethylene film webs 21 fed from rolls 20 (FIG. 5). With the lower side turned out onto the conveyor in "L" form by a per se conventional folder (not shown) to seal the block edge.

To ensure effective sealing it is necessary to butt the cut ends of consecutive blocks firmly against each other. The blocks from the VERTIFOAM machine are delivered on a transfer conveyor 14 with gaps between them and the main conveyor 16 has a facility to stop/start in order for the incoming block to catch up with the blocks already on it. This is done by means of a photo-electric cell which detects the end of the last block and causes the main conveyor to stop. The infeed conveyor continues to run. When the next block butts up against the stationary block it reactivates the photo-cell and causes the main conveyor to restart, a short time delay being built in on the restart so as to ensure a positive butting pressure.

The fan at B, C and D feeds the air to air/air heat exchangers (A/A1 and A/A2) and then to a refrigerating coil unit (RHE) with arrowed inlet and outlet for FREON (Trademark) refrigerant, circulated by a compressor (not shown) as schematically indicated in FIG. 7. The refrigeration unit may for example have a capacity of 200,000 BTU per hour (50,000K Cal per hour) at 0° C. working temperature.

The enclosure 10 is surrounded by a fume extraction enclosure (not shown) so that any leakage of undesired fumes from the cooling enclosure is prevented from escaping into the working area.

Foam blocks are fed to the machine on the roller transfer conveyor 14, which is of such a length that the blocks have reached the first exotherm peak before cooling starts. The length of this conveyor depends on the production rate of the foaming machine itself and on the speed of transfer through the cooling zone which is conveniently 1 meter per minute. A similar conveyor 17 carries the cooled blocks away. The cooling enclosure dimensions are such that the residence time of the block in the zone is sufficient to achieve cooling to a stable state and for example at the 1 meter per minute speed a cooling zone length of 2.5 meters (three times the average block width) is convenient.

Within the cooling zone the blocks are supported on conveyor 16 driven by rollers 19 and passing over side supports (not shown). The load on the conveyor is for example 0.2 lbs/sq in (0.014 Kg/sq cm).

The final suction box (E) feeds air by fan (FE) to a carbon bed CFC recovery unit (not shown) of conventional design in itself.

In FIG. 7, typical steady state air temperatures are shown, from the initial block temperature (IBT) of 160° C. to a final block temperature (FBT) of 35° C., with the cooling front profile already discussed.

Figure 8:
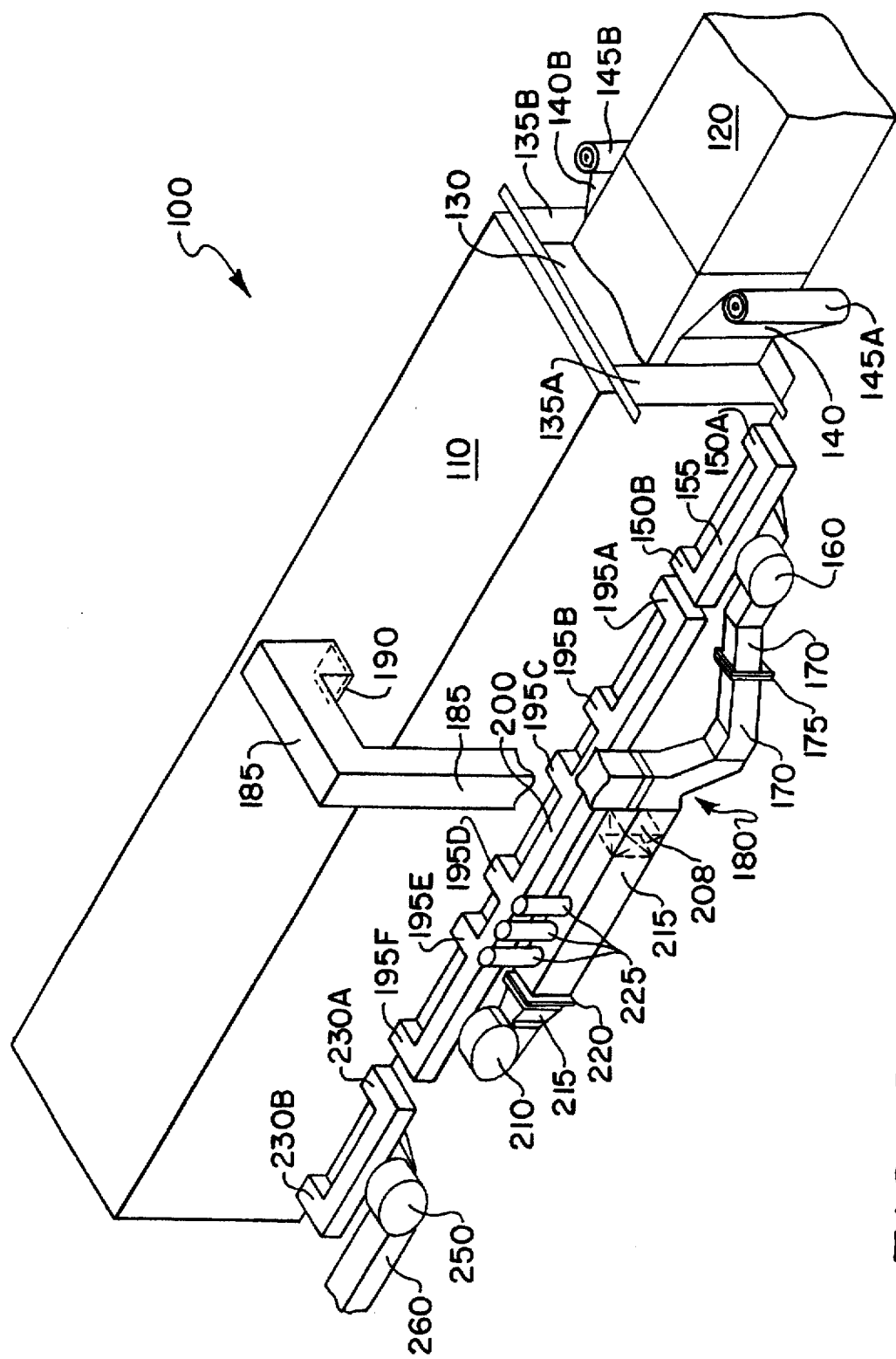
FIG. 8 is a perspective view of an alternate embodiment of a cooling apparatus according to the invention.

An alternate embodiment of the cooling apparatus of the present invention is illustrated in FIG. 8.

This apparatus 100 includes an elongated chamber 110 having an inlet opening for passage of foam blocks 120 therethrough. The figure illustrates the use of rectangular foam blocks, although round block laid on its side or a cut face can also be used. These blocks 120 pass through the chamber 110 by movement on a conveyor similar to that described above with respect to FIGS. 4–7.

Chamber 110 includes a polyethylene curtains 130, 135A, 135B for contacting the top and sides, respectively, of the block to prevent cooling gas from exiting the chamber 110. The exit opening of the chamber includes a similar curtain arrangement. In addition, polyethylene film 140A, 140B from film supply rolls 145A, 145B are used to seal the respective sides of foam block and prevent cooling gas from exiting the sides of block. While these features were included in the original installation of this embodiment, it was later found that the use of such curtains and films was not necessary to achieve the desired cooling results. Thus, these features are now considered as being optional to the invention.

Cooling of the foam block is achieved by passing cooling gas through the block in successive zones. The hottest foam entering the chamber is initially cooled in a first zone wherein a first gas mixture which has passed through the foam is drawn from outlets 150A, 150B and into common duct 155 by induced draft fan 160. Downstream of the fan 160, the gas travels through conduit 170 through filter 175 to a junction 180 for mixing with the cooled gas streams. The mixed gases travel through conduit 185 and back into the chamber 110 at opening 190. This allows cooling gas to fill the upper inside portion of chamber 110, and contact the foam in each zone therein.

Successive zones of foam are treated by cooling gas, which is then withdrawn from a plurality of second zones 195 A, B, C, D, E, F and into a common duct 200, where the gas is collected. The collected gas passes through induced draft fan 210 and thereafter into conduit 215 and through filter 220. Thereafter, the collected gas is cooled by introducing ambient air into conduit 215 through recuperators 225. Finally, the cooled gas passes to junction 180 for mixing with the first gas mixture exiting conduit 170.

In the last cooling zone, cooling gas which has pissed through the foam exits chamber 110 at outlets 230A, 230B, into common conduit 240, through induced draft fan 250, and thereafter into conduit 260 for recovery, treatment, and/or discharge as appropriate.

After utilizing the device of FIGS. 4–7 for an extended period of time, it was discovered that there was a tendency for urea crystals to build-up on radiator 8, thus reducing the efficiency of the overall cooling process and requiring cleaning or removal of such build-up. Accordingly, it was found that the use of filter 220, upstream of recuperators 225, removed sufficient condensed volatiles and other particulates to eliminate the problem of urea crystal deposits upon radiator 208.

Upon further testing and operation, it was then determined that use of radiator 208 was not mandatory for this embodiment, as the recuperators 225 provided sufficient cooling for gas collected from outlets 195 A–F. Although the radiator 208 allows much cooler gas temperatures for more rapid cooling of the foam, it was found that it is often advantageous to control the cooling of the foam at a slower rate. This slower cooling rate allows the foam to achieve better physical properties, both immediately after curing and at 24 or 48 hour later time periods.

There are different ways of achieving slow cooling rates for the foam. One way is to utilize a warmer cooling gas so that the temperature of the foam is reduced more slowly and only to relatively higher (but still acceptable) temperatures, as shown in Examples 10–14 below. By utilizing a higher temperature cooling gas, the radiator 8 becomes a non-essential component of the apparatus and cooling method. Without the radiator 208, the recuperators 225 are able to provide sufficient cooling of the gas to such relatively higher temperatures.

Another way to control the cooling rate of the foam is to control the flow rate of cooling gas through the first zone. In one embodiment, the passage of cooling gas through the first zone of the foam can be controlled by operation of fan 160. For example, at ambient conditions of 55–65 F, the temperature of the collected gas can easily be reduced to 85–120 F with the recuperators 225 alone. These cooling gas temperatures have been found to provide acceptable cooling rates and resultant cooled foam properties.

Another way to control the flow of cooling gas through the foam in the first zone is to utilize a baffle downstream of fan 160 for reducing the effective cross-sectional area of the conduit so that a reduced flow rate of the gas occurs. This baffle may assume different positions each allowing correspondingly reduced flow rates of gas therethrough.

The controlled (i.e., slow) cooling of the foam allows equal, or in some cases, improved foam physical properties to be obtained compared to foam which is not cooled according to this invention. Also, the inclusion of high humidity or moisture containing air in the cooling gas (from the recuperators) is beneficial for curing the foam, since it is known that such moisture will react with excess isocyanate groups which are present in the foam. This reaction allows the foam to achieve improved compression set properties compared to one which is treated with a cooling gas that does not contain moisture. In addition, higher isocyanate indicies can be used for foam formation, since the moisture containing cooling gas will eliminate substantially all the isocyanate groups which remain in the foam during the cooling treatment.

Where more rapid cooling of the foam is desired, radiator 208 can be included in conduit 215 downstream of recuperators 225. To assist in the removal of condensed volatiles or other particulate matter which cause the urea crystal buildup on radiator 8, filter 220 is included in conduit 215 upstream of recuperators 225. This filter 220 removes condensed volatiles and particulate matter to minimize the buildup of such contaminants on radiator 208. For additional removal of such contaminants, filter 175 (in conduit 170) could also be used.

Both filters 175 and 220 are preferably carbon absorption units which are well known to those skilled in the art. In particular, use of a carbon absorption unit as filter 175 would remove unreacted TDI from the first gas mixture, for recovery or removal of TDI therefrom. The same is true for use of a carbon absorption unit as filter 220. Thus, the final gas exiting conduit 260 may be released into the environment, since the volatiles and other contaminants have been removed either by the foam or the filters 175, 220.

EXAMPLES 10–14

Blocks of flexible polyurethane foam were produced by the VERTIFOAM continuous foam process described in U.S. Pat. No. 4,504,429. The chemical formulation for these examples was as follows:

TABLE 6

| | Parts by Weight |
|---|---|
| Polyether polyol (3500 molecular weight weight 48 hydroxyl no.) | 100 |
| Water | 4.5 |
| Silicone surfactant | 0.9 |
| Amine catalyst 'Dabco' (Trade Mark) 33LV | 0.2 |
| Stannous octoate catalyst | 0.2 |
| Trichlorofluoromethane 'Arcton' (Trade Mark) II | 1.5 |
| Toluene diisocyanate (80:20 TDI) | 55.6 |

Approximate time from the chemicals being mixed in the mixing head to the block being cut off was eight minutes. Dimensions of the block were 1.7 meters wide×1.1 meters high×various lengths (cut face to cut face).

The foam blocks were positioned in the cooling enclosure so that the air flow direction through the block was from one cut face to the other.

The device of FIG. 8 was used for cooling of these foam blocks.

Temperatures in the foam were monitored by thermocouples placed as shown in Table 7:

TABLE 7

| Reference | Location |
|---|---|
| Temp 1 | Inserted to a depth of 10 mm into the center of the inlet face of the block |
| Temp 2 | Threaded by means of a long 'needle' about 1/3 the way into the center of the block |
| Temp 3 | Threaded by means of a long 'needle' about 2/3 the way into the center of the block |
| Temp 4 | Inserted to a depth of 10 mm into the center of the outer face of the block |
| C1 | Gas temperature in duct 155 (cooling zone 1) |
| C2 | Gas temperature in common duct for outlets 195A and 195B (cooling zone 2) |
| C3 | Gas temperature in common duct for outlets 195C and 195D (cooling zone 3) |
| C4 | Gas temperature in common duct for outlets 195E and 195F (cooling zone 4) |
| C5 | Gas temperature in outlet 260 (cooling zone 5) |
| C6 | Gas temperature in conduit 215 downstream of radiator 208 |
| C7 | Return cooling gas temperature (duct 185) |

EXAMPLE 10

A rectangular foam block as described above but having a length of about 2.9 meters (114") was subjected to a cooling treatment using the apparatus of FIG. 8 and including radiator 208. Plastic film was placed on each side of the block as it entered the chamber 110 and the conveyor speed was 3.9 ft./min. The TDI index of the foam was 116, and the ambient temperature was 55° F. with a relative humidity of 32%. The 27 ILD foam thus produced was cooled with the following temperatures:

| Location | Temperature (F) |
|---|---|
| C1 | 110 |
| C2 | 112 |
| C3 | 99 |
| C4 | 108 |
| C5 | 97 |
| C6 | 38 |
| C7 | 57 |

Figure 9:
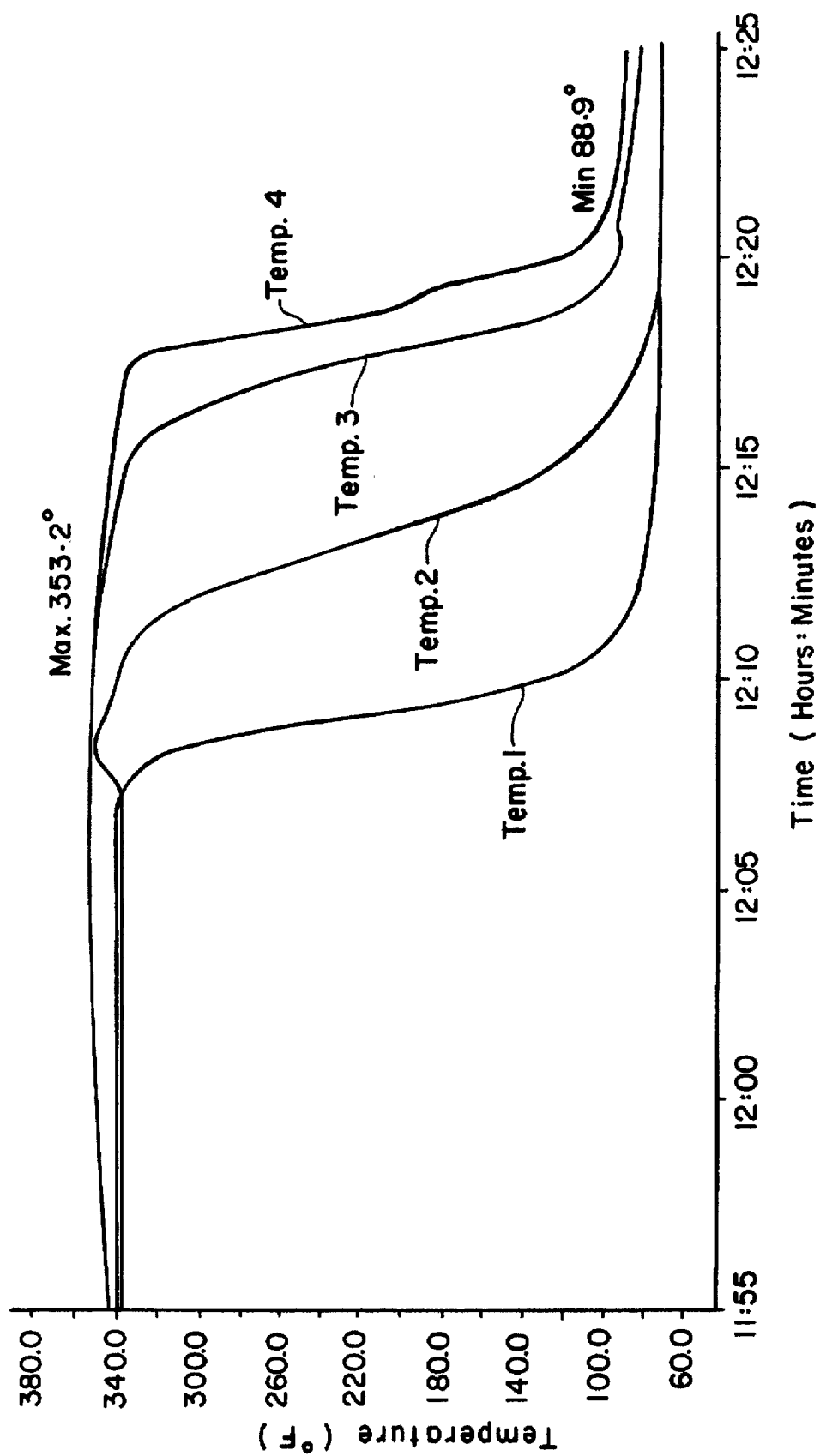
FIGS. 9, 10, 11, 12, and 13 are graphical illustrations of temperature gradients throughout the foam block during the cooling process.

Also, a graphical illustration of Temps 1–4 over time is shown in FIG. 9. The maximum foam temperature was 353.2 F and the minimum cooled foam temperature was 88.9 F. As shown in the graph, the foam Was cooled in about 8 minutes to the final temperature.

Physical properties for the cooled foam block compared to non-cooled foam appear below in Table 8.

TABLE 8

Physical Test Results - Example 10

|  | Cooled Block | Non-Cooled Block |
|---|---|---|
| Sample density, Kg/m3 |  |  |
| Top of block | 11.9 | 11.9 |
| Middle of block | 11.9 | 11.6 |
| Bottom of block | 12.1 | 12.1 |
| Internal Force Deflection ("IFD") |  |  |
| 25% |  |  |
| Top of block | 27.9 | 27.9 |
| Middle of block | 27.4 | 27.3 |
| Bottom of block | 27.6 | 27.4 |

TABLE 8-continued

Physical Test Results - Example 10

|  | Cooled Block | Non-Cooled Block |
|---|---|---|
| 65% |  |  |
| Top of block | 59.0 | 58.9 |
| Middle of block | 56.8 | 56.7 |
| Bottom of block | 60.8 | 59.6 |
| 25% |  |  |
| Top of block | 16.5 | 16.3 |
| Middle of block | 15.2 | 15.2 |
| Bottom of block | 16.4 | 16.1 |

After 24 hours, density and IFD values were again measured, with the results shown in Table 9.

TABLE 9

24 Hour Properties of Cooled Block

| Sample Density Kg/m³ |  |
|---|---|
| Top of block | 11.9 |
| Middle of block | 11.8 |
| Bottom of block | 11.9 |
| IFD |  |
| 25% |  |
| Top of block | 29.1 |
| Middle of block | 26.1 |
| Bottom of block | 27.2 |
| 65% |  |
| Top of block | 59.4 |
| Middle of block | 57.1 |
| Bottom of block | 58.2 |
| 25% |  |
| Top of block | 16.9 |
| Middle of block | 16.1 |
| Bottom of block | 16.5 |

These results show that the properties of the cooled foam are comparable to non-cooled foam without the need for extended storage or cooling time.

EXAMPLE 11

A block of the same formulation and process as Example 10 was taken and was subjected to the same procedure as Example 1 except that the radiator was not used.

The length of the block was about 2 meters, and the conveyor speed was 3.97 ft./min. No plastic film was utilized on the sides of the block. The TDI index of the foam again was 116, and the ambient temperature was 66 F with a relative humidity of 18.8%.

The following temperatures were applicable:

| Location | Temperature (F) |
|---|---|
| C1 | 125 |
| C2 | 120 |
| C3 | 119 |
| C4 | 119 |
| C5 | 105 |
| C6 | 81 |
| C7 | 88 |

Figure 10:
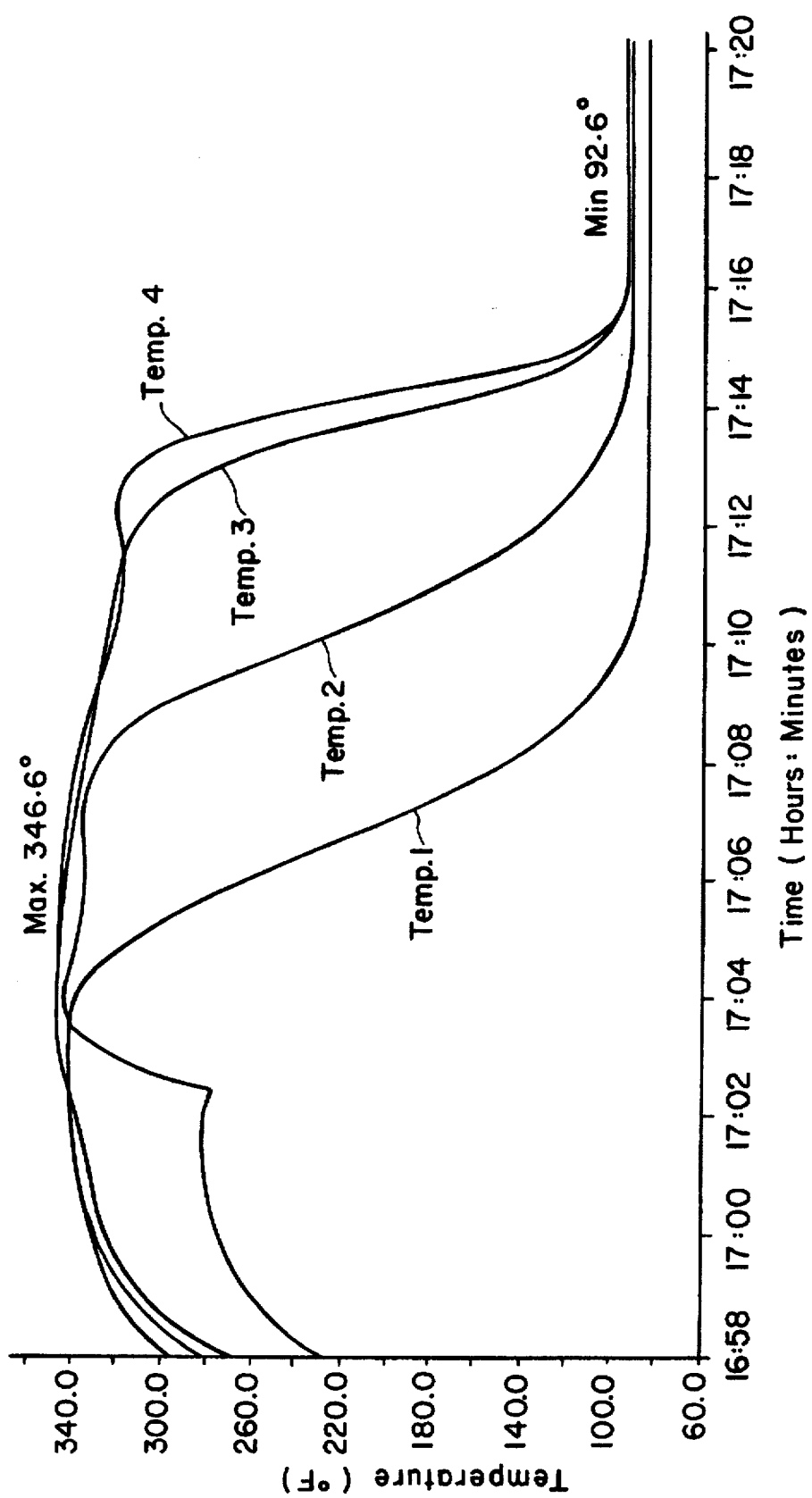

Temps 1-4 over time are illustrated graphically in FIG. 10. The maximum temperature of the foam was 346.6 F and the minimum cooled foam temperature was 92.6 F. The foam was cooled in about twelve minutes.

Physical tests of the foam were again measured after two and twenty-four hours with the results shown in Table 10.

TABLE 10

|  | Cooled Block (2 Hr.) | Cooled Block (24 Hr.) |
|---|---|---|
| Sample density, Kg/m3 | | |
| Top of block | 11.8 | 12.3 |
| Middle of block | 11.8 | 11.8 |
| Bottom of block | 11.9 | 11.9 |
| IFD 25% | | |
| Top of block | 29.0 | 31.1 |
| Middle of block | 25.5 | 27.2 |
| Bottom of block | 24.4 | 27.1 |
| 65% | | |
| Top of block | 57.3 | 61.7 |
| Middle of block | 51.3 | 54.7 |
| Bottom of block | 50.3 | 54.5 |
| 25% | | |
| Top of block | 16.6 | 18.3 |
| Middle of block | 14.3 | 15.8 |
| Bottom of block | 13.6 | 15.4 |

These results show that the properties of controlled cooled foam are improved over that of Example 10 due to the slower cooling rate of the foam.

EXAMPLE 12

A block of the same formulation and process as Example 10 was used except that the ambient air temperature was 69 F and the relative humidity was 40%. However, all moisture in the air was removed by operation of the radiator 208 to lower the temperature in duct 215 to 37 F.

The following temperatures were applicable:

| Location | Temperature (F) |
|---|---|
| C1 | 106 |
| C2 | 98 |
| C3 | 97 |
| C4 | 83 |
| C5 | 56 |
| C6 | 37 |
| C7 | 59 |

Figure 11:
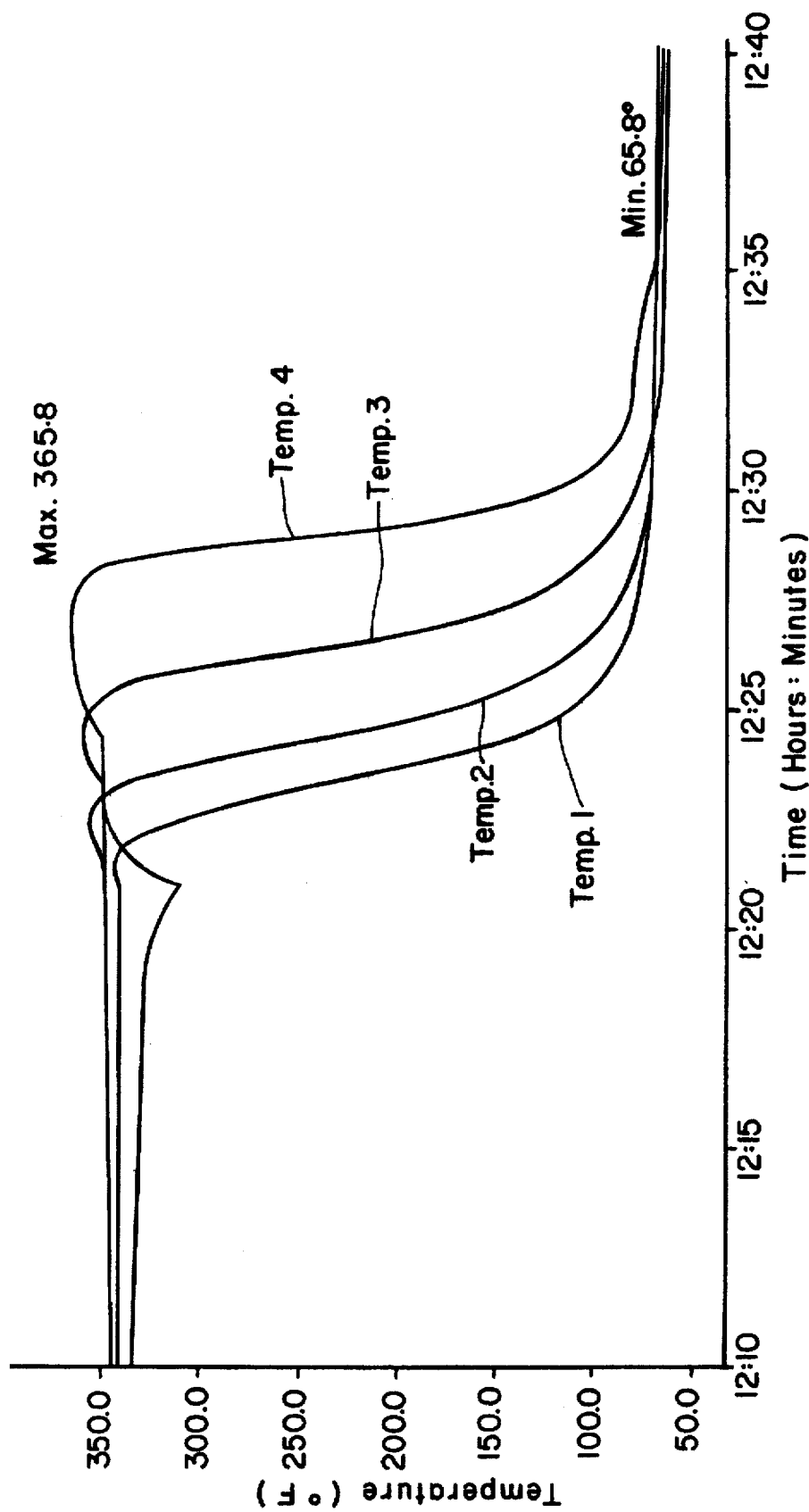

Also, Temps 1-4 over time are illustrated graphically in FIG. 11. The maximum temperature of the foam ws 365.8 F and the minimum cooled foam temperature was 65.8 F. The foam was cooled in about six minutes. Physical properties were measured and appear in Table 11.

TABLE 11

|  | Cooled Block (after 2 Hr. | Cooled Block (after 24 Hr. |
|---|---|---|
| Sample density, Kg/m3 | | |
| Top of block | 11.6 | 11.6 |
| Middle of block | 11.6 | 11.5 |

TABLE 11-continued

|  | Cooled Block (after 2 Hr. | Cooled Block (after 24 Hr. |
|---|---|---|
| Bottom of block | 12.1 | 12.1 |
| IFD 25% | | |
| Top of block | 22.6 | 24.6 |
| Middle of block | 24.0 | 24.0 |
| Bottom of block | 24.0 | 24.5 |
| 65% | | |
| Top of block | 48.4 | 50.7 |
| Middle of block | 50.0 | 49.4 |
| Bottom of block | 55.1 | 57.3 |
| 25% | | |
| Top of block | 13.0 | 14.3 |
| Middle of block | 13.1 | 13.1 |
| Bottom of block | 13.1 | 13.5 |

For comparison purposes, a similar foam block was not subjected to this cooling treatment, and the following properties were measured as set forth in Table 12.

TABLE 12

|  | Cooled Block (2 Hr) | Cooled Block (24 Hr.) |
|---|---|---|
| Sample density, Kg/m3 | | |
| Top of block | 11.6 | 11.8 |
| Middle of block | 11.5 | 11.9 |
| Bottom of block | 11.9 | 11.8 |
| IFD 25% | | |
| Top of block | 25.7 | 27.2 |
| Middle of block | 27.6 | 27.9 |
| Bottom of block | 26.3 | 26.8 |
| 65% | | |
| Top of block | 53.9 | 56.1 |
| Middle of block | 56.0 | 57.7 |
| Bottom of block | 58.2 | 57.4 |
| 25% | | |
| Top of block | 14.4 | 15.9 |
| Middle of block | 15.3 | 15.5 |
| Bottom of block | 15.8 | 16.0 |

EXAMPLE 13

Example 12 was repeated except additional moisture was added to return line 185 at a rate of 0.5611 pounds per minute to effect a moisture cure of the foam. The following temperatures was applicable:

| Location | Temperature (F) |
|---|---|
| C1 | 110 |
| C2 | 102 |
| C3 | 100 |
| C4 | 102 |
| C5 | 85 |
| C6 | 38 |
| C7 | 60 |

Figure 12:
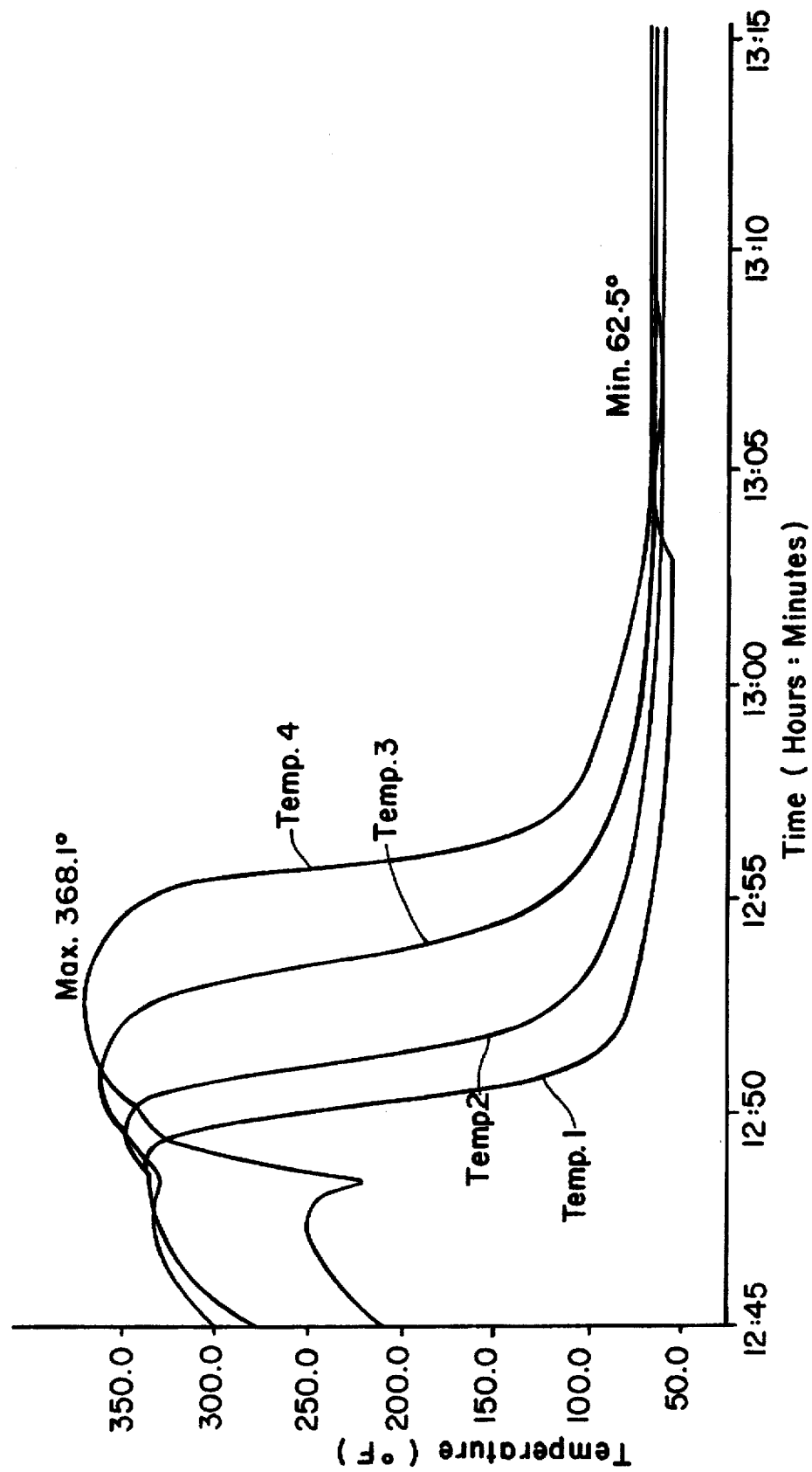

Temps 1-4 over time are illustrated graphically in FIG. 12. For thie example, the maximum foam temperature was 368.1 F, and it was cooled to a minimum of 62.5 F over a period of about 10 minutes. Physical properties were measured and appear in Table 13.

TABLE 13

|  | Cooled Block (2 Hr.) | Cooled Block (24 Hr.) |
|---|---|---|
| Sample density, Kg/m3 |  |  |
| Top of block | 11.6 | 11.6 |
| Middle of block | 11.5 | 11.6 |
| Bottom of block | 11.9 | 11.8 |
| IFD |  |  |
| 25% |  |  |
| Top of block | 25.3 | 26.5 |
| Middle of block | 25.5 | 27.2 |
| Bottom of block | 24.2 | 24.3 |
| 65% |  |  |
| Top of block | 53.8 | 54.4 |
| Middle of block | 54.5 | 54.8 |
| Bottom of block | 55.0 | 53.4 |
| 25% |  |  |
| Top of block | 14.0 | 15.1 |
| Middle of block | 13.8 | 14.2 |
| Bottom of block | 13.5 | 13.4 |

These results show similar performance for cooled foam compared to non-cooled foam.

EXAMPLE 14

A foam similar to that of Example 11 was prepared. Radiator 208 was not used, and only one of recuperators 225 was operated. The foam block was about 2.7 meters long, and the conveyor speed was 3.86 ft./min. Plastic side curtains 140 A,B were used, and the ambient air was at a temperature of 62 F and at a relative humidity of 74%. The temperatures were as follows:

| Location | Temperature (F.) |
|---|---|
| C1 | 156 |
| C2 | 152 |
| C3 | 157 |
| C4 | 142 |
| C5 | 125 |
| C6 | 111 |
| C7 | 116 |

Figure 13:
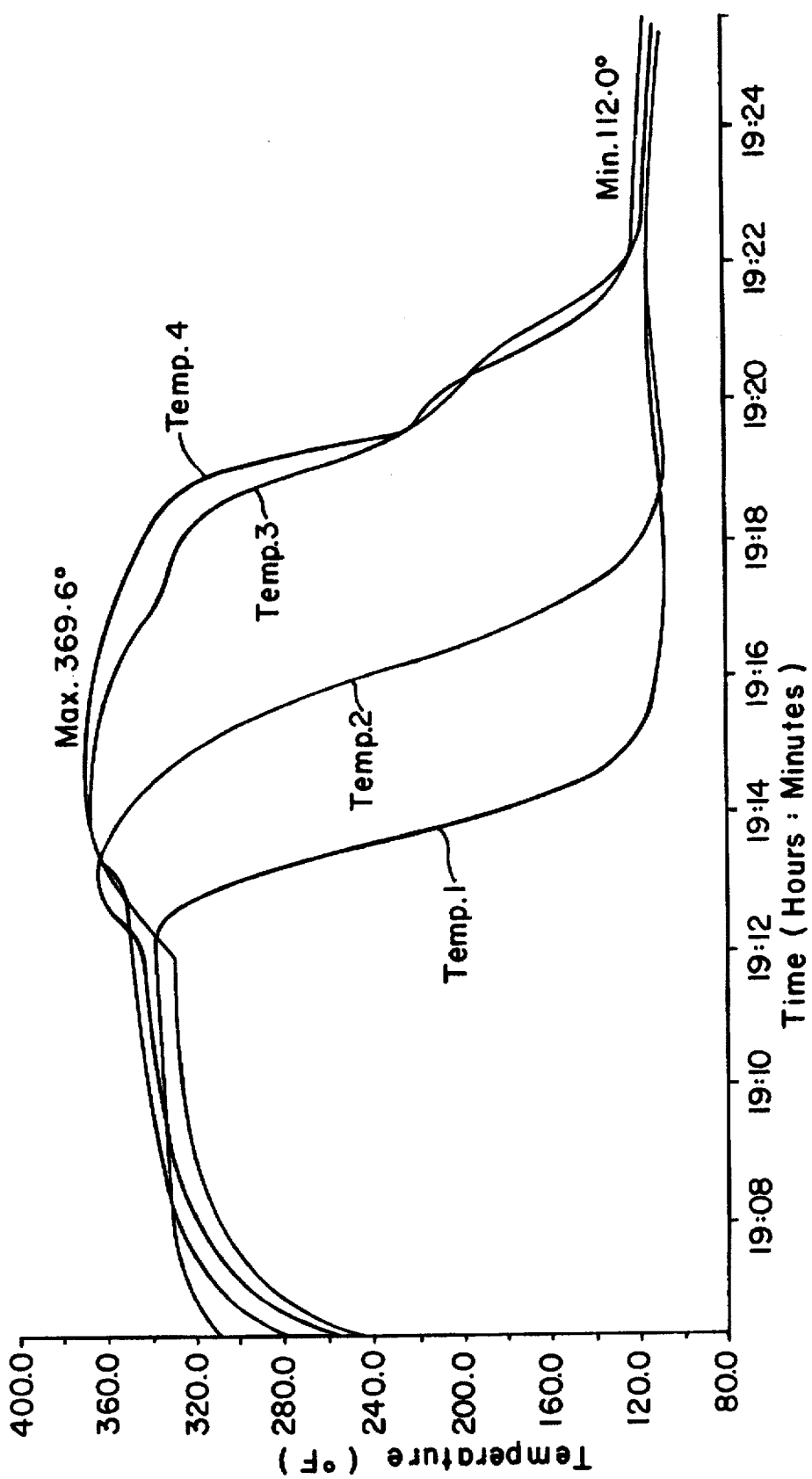

Temps 1–4 over time are illustrated in FIG. 13. The maximum foam temperature of 369.6 F was cooled to 112 F over a period of about 9 minutes.

Physical properties were measured at 24 and 48 hours after cooling and the results are shown in Table 14.

TABLE 14

|  | Cooled Block (24 Hr.) | Cooled Block (48. Hr.) |
|---|---|---|
| Sample density, Kg/m3 |  |  |
| Top of block | 11.9 | 11.9 |
| Middle of block | 11.9 | 11.9 |
| Bottom of block | 11.9 | 12.1 |
| IFD |  |  |
| 25% |  |  |
| Top of block | 25.3 | 26.3 |
| Middle of block | 24.9 | 27.3 |
| Bottom of block | 24.1 | 27.5 |
| 65% |  |  |
| Top of block | 47.8 | 52.0 |
| Middle of block | 49.2 | 53.3 |
| Bottom of block | 46.3 | 53.4 |
| 25% |  |  |
| Top of block | 15.2 | 16.4 |
| Middle of block | 14.9 | 16.4 |
| Bottom of block | 14.4 | 15.9 |
| Compression Set (90%) |  |  |
| Top of block | 22.7 | 23 |
| Middle of block | 26.1 | 26 |
| Bottom of block | 34.3 | 34 |

The comparison set properties of this foam were improved substantially compared to foams which were cooled under more rapid conditions. This suggests that relatively higher cooling gas temperatures are preferred when improved compression set properties are desired. A cooling gas temperature range of about 90 to 120 F is useful.

While it is apparent that the invention herein disclosed is well calculated to fulfill the objectives stated above, it will be appreciated that numerous modifications and embodiments may be devised by those skilled in the art, and it is intended that the appended claims cover all such modifications and embodiments as fall within the true spirit and scope of the present invention.

What is claimed is:

1. A process for cooling polyurethane foam which comprises:

passing first cooling gases through a first section of a polyurethane foam block in a first cooling zone at a predetermined flow rate to cool the foam and to remove volatiles therefrom;

thereafter passing second cooling gases through the same foam block section in a second cooling zone at a predetermined flow rate to further cool the foam and to further remove volatiles therefrom;

withdrawing at least a portion of the second cooling gases which exit the foam block section from the second zone; and recovering volatiles from the withdrawn portion of the second cooling gases.

2. The process of claim 1 wherein the volatiles include at least one of toluene diisocyanate, butylated hydroxy toluene, chlorofluorocarbons or other solvents or auxiliary blowing agents, and which further comprises recovering one or more of the volatiles in an adsorption system.

3. The process of claim 1 wherein the cooling gases comprise air or nitrogen and at least a portion of the second cooling gases which has passed through the foam block section in one cooling zone is recirculated for use as part of the cooling gases in one of the other cooling zones.

4. A process for cooling polyurethane foam which comprises:

passing first cooling gases through polyurethane foam in a first cooling zone at a predetermined flow rate to cool the foam and to remove volatiles therefrom;

thereafter passing second cooling gases through the foam in a second cooling zone at a predetermined flow rate to further cool the foam and to further remove volatiles therefrom;

withdrawing at least a portion of the second cooling gases which exit the foam from the second zone;

recovering volatiles from the withdrawn portion of the second cooling gases; and removing condensed or sublimed volatiles from said portion of the second cooling gases prior to recovering the remaining volatiles.

5. The process of claim 4 which further comprises cooling the first cooling gases which exit the foam from the first zone and mixing the resultant cooled gases with the second cooling gases which exit the foam from the second zone to form a gas mixture and to condense or sublime volatiles therein.

6. The process of claim 5 wherein the condensed or sublimed volatiles are removed by recirculating and passing the gas mixture through the foam to deposit the condensed or sublimed volatiles thereon.

7. The process of claim 1 which further comprises passing cooling gases through the foam in a third cooling zone at a predetermined flow rate to further cool the foam and to remove volatiles therefrom.

8. The process of claim 7 which further comprises mixing the gases which exit the foam from the third cooling zone with the gases which exit the foam from the first cooling zone to condense or sublime one or more of the volatiles and to form a gas mixture, and passing the gas mixture through the foam to filter the condenses or sublimed volatiles therein.

9. The process of claim 8 which further comprises recirculating a portion of the cooling gases that exit the foam from the third zone as for mixing with the gas mixture.

10. The process of claim 8 which further comprises removing particulate matter from the gas mixture prior to mixing with the portion of the cooling gases that exits the foam from the third cooling zone of the foam.

11. The process of claim 8 which further comprises removing particulate matter from the gases which exit the foam from the third cooling zone prior to mixing with the gas mixture.

12. A process for cooling polyurethane foam which comprises:

passing first Cooling gases through polyurethane foam in a first cooling zone at a predetermined flow rate to cool the foam and to remove volatiles therefrom;

adding an auxiliary reactant to the cooling gases for introduction into the foam to modify one or more properties thereof;

thereafter passing second cooling gases through the foam in a second cooling zone at a predetermined flow rate to further cool the foam and to further remove volatiles therefrom;

withdrawing at least a portion of the second cooling gases which exit the foam from the second zone; and recovering volatiles from the withdrawn portion of the second cooling gases.

13. The process of claim 1 which further comprises adding moisture to the cooling gases to accelerate the curing of the foam.

14. The process of claim 3 wherein the air is high humidity air to accelerate the curing of the foam.

15. The process of claim 2 wherein the adsorption system comprises a carbon adsorption bed.

16. The process of claim 1 which further comprises cooling the first cooling gases which exit the foam from the first zone by mixing the gases with the second cooling gases which exit the foam from the second zone to form a gas mixture and to condense or sublime volatiles therein.

17. The process of claim 16 wherein the condensed or sublimed volatiles are recovered by recirculating and passing the gas mixture through the foam to deposit the condensed or sublimed volatiles thereon.

* * * * *